Inventors
Gerald David Walley
Thomas William Smith
Robert Philip Stewart Wilson
By
Bailey, Stephens + Huettig
Attorneys Feb. 20, 1968  G. D. WALLEY ETAL  3,369,771
SPACE VEHICLES
Filed June 16, 1965  8 Sheets-Sheet 4
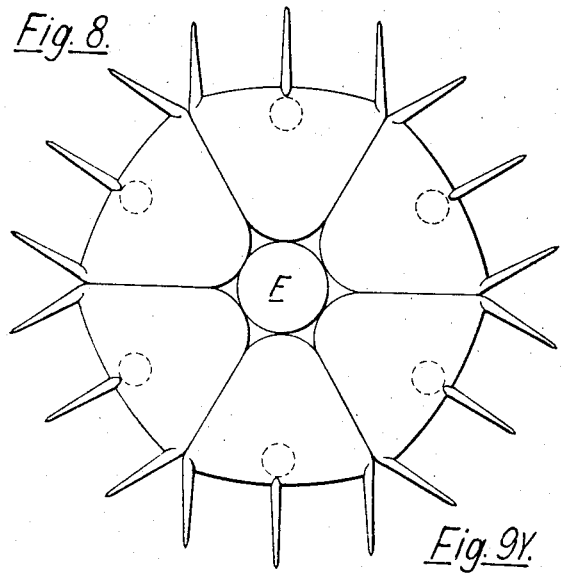
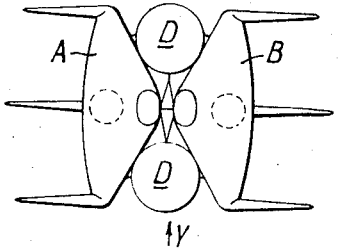
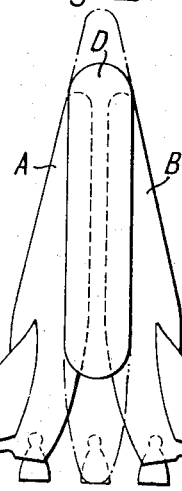
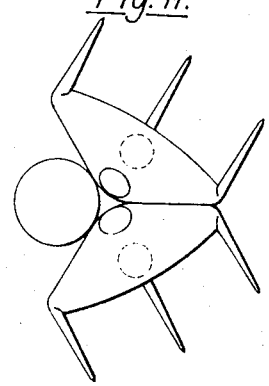
Inventors
Gerald David Walley
Thomas William Smith
Robert Philip Stewart Wilson
By
Bailey, Stephens + Huettig
Attorneys Feb. 20, 1968 G. D. WALLEY ETAL 3,369,771
SPACE VEHICLES
Filed June 16, 1965 8 Sheets-Sheet 5
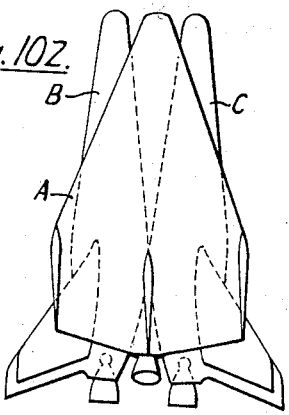
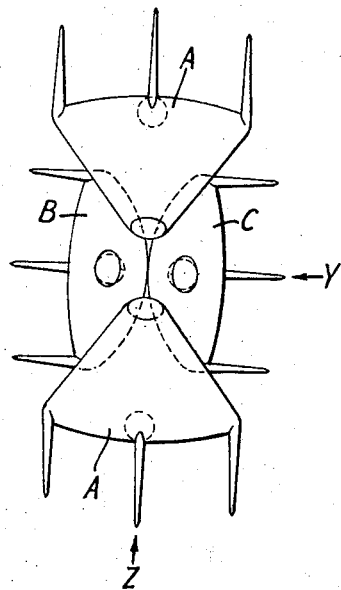
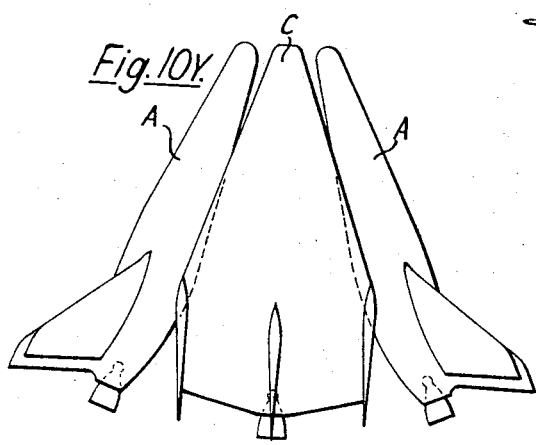
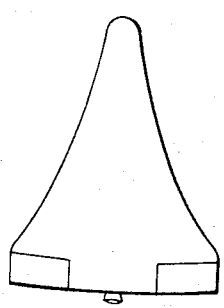
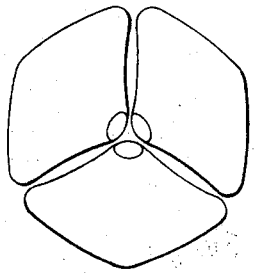
Inventors
Gerald David Walley
Thomas William Smith
Robert Philip Stewart Wilson
By
Bailey, Stephens + Huettig
Attorneys

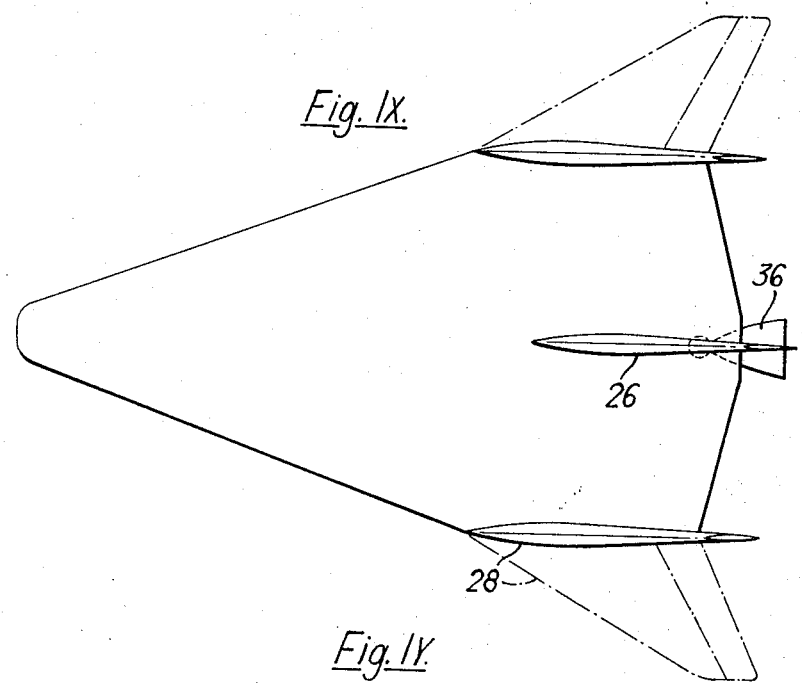
Fig. IX.
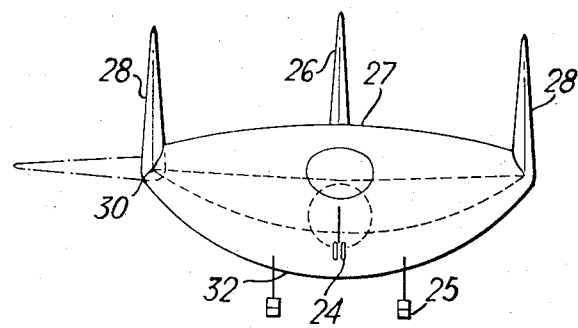
Fig. IY.
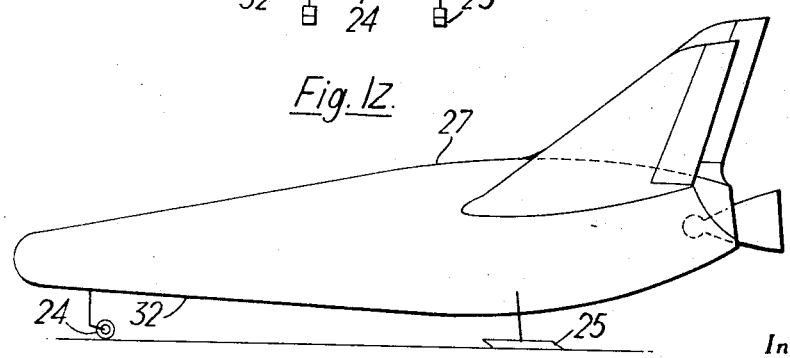
Fig. IZ.
Inventors
Gerald David Walley
Thomas William Smith
Robert Philip Stewart Wilson
BY Bailey Stephens + Huettig
Attorneys

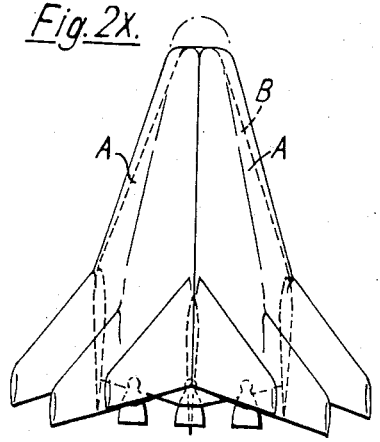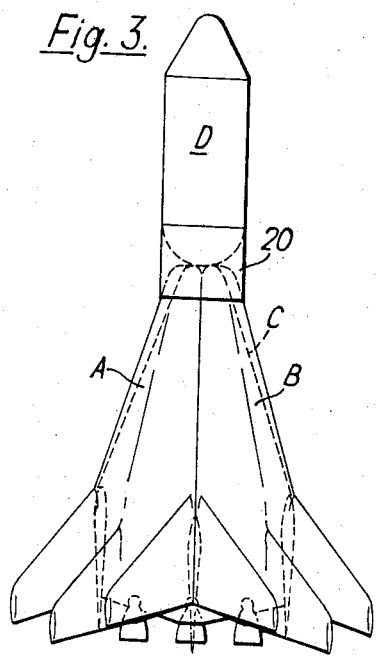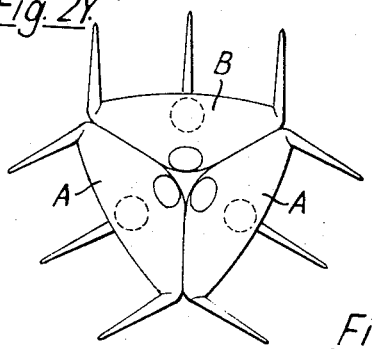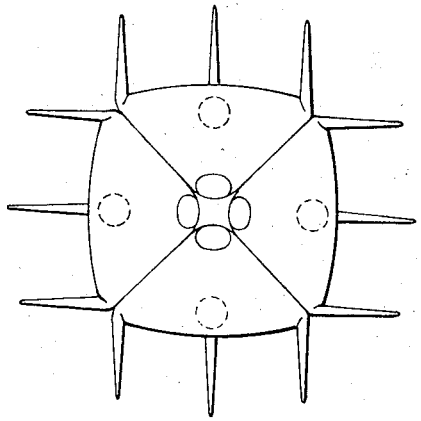

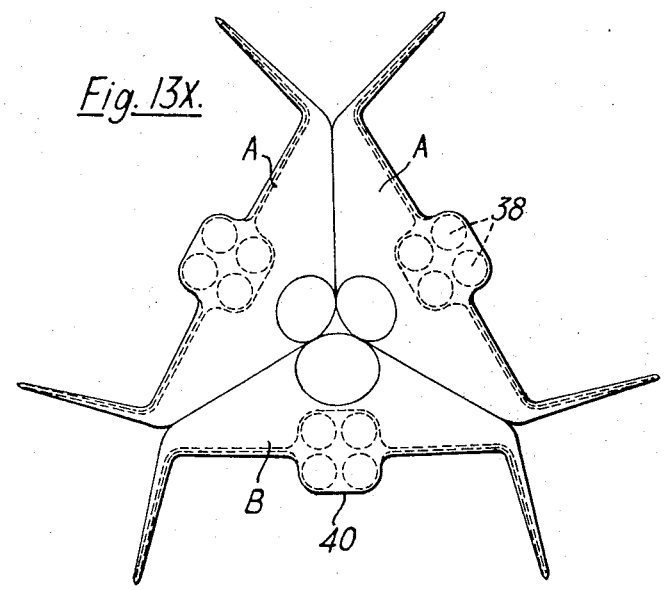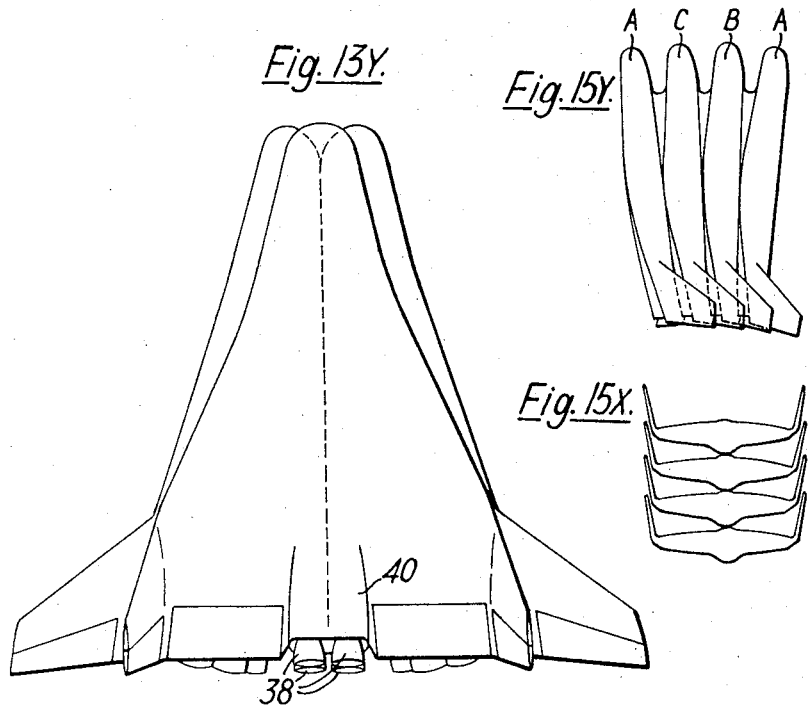

Feb. 20, 1968  G. D. WALLEY ETAL  3,369,771

SPACE VEHICLES

Filed June 16, 1965  8 Sheets-Sheet 7

Inventors
GERALD DAVID WALLEY
THOMAS WILLIAM SMITH
ROBERT PHILIP STEWART WILSON
By
Bailey, Stephens + Huettig
Attorneys

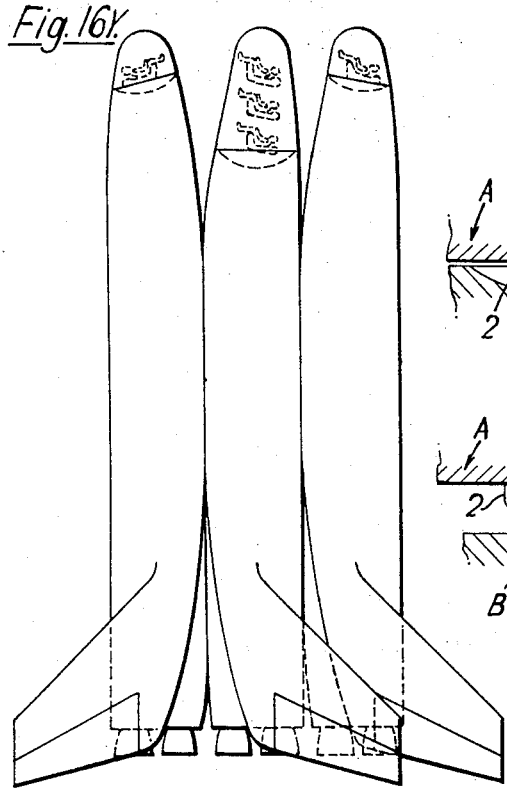
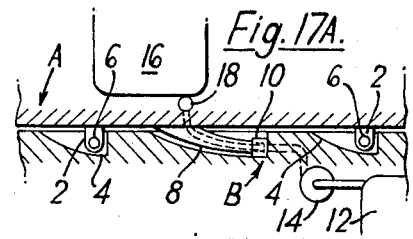
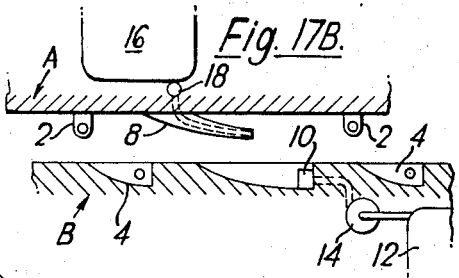
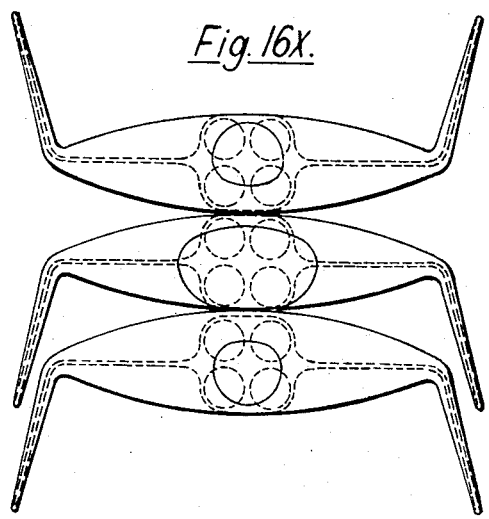

United States Patent Office 3,369,771
Patented Feb. 20, 1968

3,369,771
SPACE VEHICLES
Gerald David Walley, Longridge, near Preston, Thomas William Smith, Wrea Green, near Preston, and Robert Philip Stewart Wilson, Blackburn, England, assignors to British Aircraft Corporation (Operating) Limited, London, England, a company of Great Britain
Filed June 16, 1965, Ser. No. 464,481
Claims priority, application Great Britain, June 18, 1964, 23,219/64
11 Claims. (Cl. 244—1)

ABSTRACT OF THE DISCLOSURE

A space vehicle composed of a plurality of interconnected modules, at least one intended as a first stage, and having a final stage, two of the modules being so shaped as to be capable of flight in the atmosphere with aerodynamic lift, the modules having a delta planform and carrying large amounts of fuel; the modules further having rocket nozzles at the rear which are exposed when the modules are assembled together; the modules preferably being assembled in a pyramid.

---

This invention concerns vehicles which include a final stage intended to travel beyond the earth's atmosphere, and a first stage intended to accompany the final stage during the first part of launching, and then become separated from it.

According to the present invention such a vehicle is assembled from components grouped together, including at least two units which are similar in shape and which are shaped so that individually they are capable of flight in the atmosphere with substantial aerodynamic lift, at least two of these units each having a rear propulsion nozzle system and being so placed in the assembly that its nozzle system can operate prior to separation of the components from one another.

Each of the units will be referred to in the remainder of this specification and claims as a "module."

The assembly may consist entirely of two or more modules, or it may consist of a combination of two or more modules with one or more other components, for example auxiliary fuel tanks, or additional rockets either for boosting or for final stage operation.

The primary object of the invention is that some at least of the modules should be recoverable. This represents a substantial economy especially in the cost of rocket motors. In addition this may enable space vehicles to be launched over populated areas without danger. To assist recovery, each recoverable module should house a pilot, either human or automatic.

The final stage preferably consists of one of the modules, but may, as already mentioned, be another component.

There may be more than two stages.

In preferred arrangements all the modules are so placed that their nozzle systems can operate prior to separation, and there is means for transferring fuel between modules in such a way that, upon separation, the modules or module which are to continue as a further stage have a full load of fuel, while these modules which are to descend and be recovered have no more fuel than is recovered for manoeuvre and landing.

A preferred shape for the modules has a delta planform, and has a deep cross section to accommodate large quantities of fuel.

Figure 4:
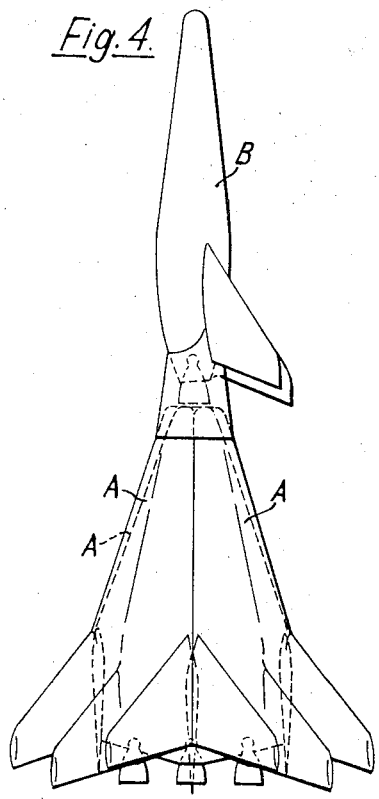
Figure 5:
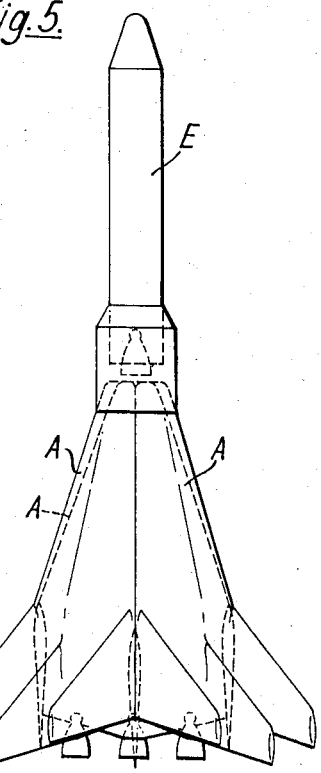
Figure 7:
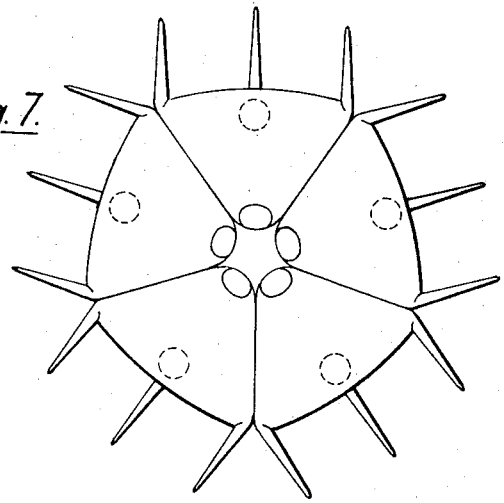
Figure 14Y:
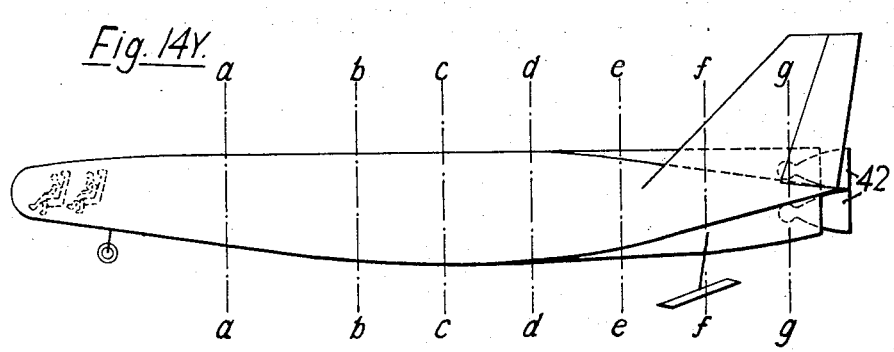
Figure 14X:
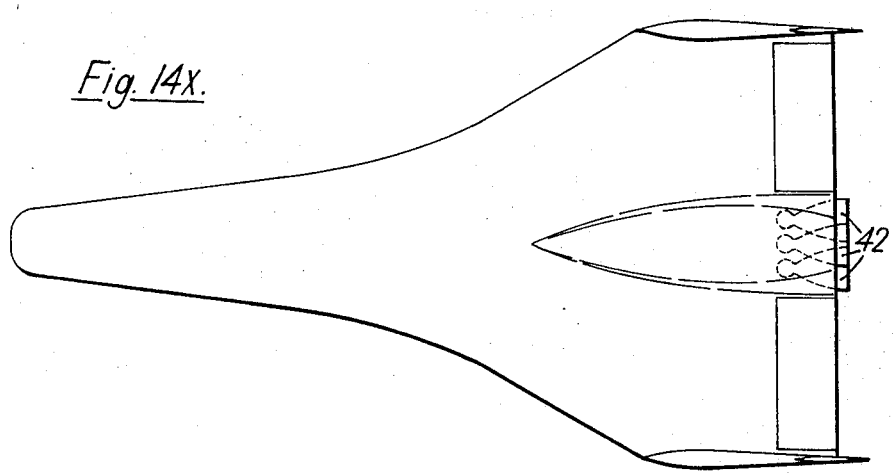
Figure 14Z:
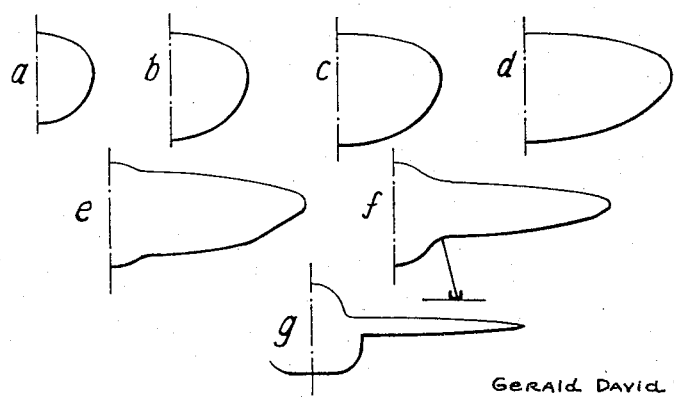

A variety of different assembly arrangements are illustrated by the accompanying drawings in which:

FIGURES 1X, 1Y and 1Z are respectively a plan, a front elevation, and a side elevation of one module, in landing attitude;
FIGURES 2X and 2Y are respectively a side elevation and a plan of a first vehicle, in launching attitude;
FIGURE 3 is a side elevation of a second vehicle;
FIGURE 4 is a side elevation of a third vehicle;
FIGURE 5 is a side elevation of a fourth vehicle;
FIGURE 6 is a plan of a fifth vehicle;
FIGURE 7 is a plan of a sixth vehicle;
FIGURE 8 is a plan of a seventh vehicle;
FIGURES 9X and 9Y are respectively a plan and a side elevation of an eighth vehicle;
FIGURES 10X, 10Y and 10Z are respectively a plan, and two side elevations, seen in the directions of the arrows Y and Z in FIGURE 10X, of a ninth vehicle;
FIGURE 11 is a plan of a tenth vehicle;
FIGURES 12X and 12Y are respectively a plan and a side elevation of an eleventh vehicle;
FIGURES 13X and 13Y are respectively a plan and a side elevation of a twelfth vehicle;
FIGURES 14X, 14Y and 14Z are respectively a plan, a side elevation, and a series of cross sections, of a second module;
FIGURES 15X and 15Y are respectively a plan and a side elevation of a thirteenth vehicle;
FIGURES 16X and 16Y are respectively a plan and a side elevation of a fourteenth vehicle; and
FIGURES 17A and 17B are diagrams of a releasable connection.

FIGURES 1X, 1Y and 1Z serve to show the shape of one module, two or more of which are used in making the vehicles shown in FIGURES 2 to 12.

The module is substantially a "flying wing," and the majority of its interior is occupied by fuel tanks. In the centre of its rear end is a rocket motor unit 36 which can be swivelled as a means of directional control when outside the atmosphere. During the early part of re-entry to the atmosphere, the module will travel with its "under" surface 32 foremost, more or less at right angles to its direction of travel. In order to keep down heating under these conditions, the whole of the under surface has large radii of curvature.

In the first vehicle shown in FIGURES 2X and 2Y, three modules are arranged in a pyramid. Two of the modules A form the first stage, and one module B forms the second, in this example final, stage. During initial launching, the fuel in the final stage module is conserved, and the nozzle of the final stage module receives fuel from the other modules. Alternatively, fuel from all vehicles is used but some is conserved in each first stage module and then transferred to the final stage module during a brief coasting phase immediately before separation.

FIGURES 17A and 17B illustrate a connection between two modules A and B, FIGURE 17A while attached, and FIGURE 17B after separation. The module A has lugs 2 received in recesses 4 in the module B, and secured by explosive bolts 6. In addition, a probe 8 on the module A engages a socket 10 on the module B via a quick-release sealing coupling. Just before separation of the modules, fuel from a tank 12 in the module B is transferred by a pump 14, through the probe, to a tank 16 in the module A, via a non-return valve 18. Then the bolts 6 are fired, and the thrust of the motor of the module A carries it forward relatively to the module B, as shown in FIGURE 17B. As an alternative to explosive bolts, various forms of known mechanism as used for releasing bombs from aircraft, may be employed.

In the second vehicle, shown in FIGURE 3, three modules A, B and C are arranged in a pyramid, with an auxiliary fuel tank D in front of them. During launching and initial flight, fuel from all the modules is used; then, just before separation, the fuel in the auxiliary tank is transferred to the final stage module B. On separation, the auxiliary tank D is destroyed. The space between the rear end of the fuel tank D and the noses of the modules A, B, and C is bridged by a sleeve-shaped fairing 20. This is connected to the modules and to the fuel tank by explosive bolts or other releasable fastenings, not shown.

In the third vehicle, shown in FIGURE 4, three modules A are arranged in a pyramid, with a further module B in front of them. No transfer of fuel occurs, and the module B acts as the final stage.

In the fourth vehicle, shown in FIGURE 5, three modules are arranged in a pyramid, with a rocket E in front of them. The rocket acts as the final stage.

FIGURES 6 to 8 show how larger numbers of modules, from four to six, may be arranged in a pyramid, in place of the pyramid of three modules in each of the arrangements shown in FIGURES 2 to 4. In FIGURE 8 there is a central component F, which may be an auxiliary fuel tank, or may be a booster rocket.

In all the arrangements in FIGURES 2 to 8, the modules are shaped to enable them to fit closely together. By varying the angles of the abutting surfaces various numbers of modules may be clustered together. The modules may abut over surfaces of substantial area, or may make only line contact, or make contact through intermediary spacers or fairings. When the modules, together with any auxiliary tanks or booster rockets, if used, are clustered together, any undesirable openings are closed by additional covers or fairings, not shown, which are jettisoned or disintegrated on separation.

The modules may conveniently have retractable three point undercarriages 24, 25 (FIGURE 1), which may connect the modules and auxiliary tanks or booster rockets together. Explosive bolts and other quick release links are attached to the undercarriage mountings, and are released when separation of the modules is required.

The surface of each module which is outwards in a pyramid may be either the "upper" or the "lower" surface of the module when in individual flight. In FIGURES 2 to 8 it is the "upper" surface (marked 27 in FIGURE 1) which is outwards.

Each module preferably has, as shown in FIGURE 1, an upwardly-extending central control surface 26 and a pair of second control surfaces 28 hinged to the outer ends of the wing on fore-and-aft hinges 30.

In the eighth vehicle, shown in FIGURE 9, two modules A, B are arranged in mirror-image relationship, with their "lower" surfaces towards one another. Auxiliary fuel tanks D are attached between the wings of the modules. Alternatively, booster rockets may be used in place of auxiliary fuel tanks.

Various modes of operation of a vehicle as shown in FIGURE 9 are possible. For example:

(1) With the auxiliary units D as simple fuel tanks, one of the modules constitutes the final stage of the vehicle. During initial launching, the fuel in the final stage module is conserved, and fuel from the auxiliary tanks and the booster module is fed to the rocket motors of both modules. Upon separation, the auxiliary units are disintegrated, the final stage module proceeds on its way using the fuel within it, and the other module is brought in to land, preferably having some fuel left for manoeuvre.

(2) As an alternative to (1), fuel from all sources is used in initial launching, but not all is used. Then, during a brief period of coasting before separation, most of the remaining fuel is transferred to the final-stage module. In this way eccentricity of the centre of gravity during initial launching is avoided.

(3) With auxiliary units including rocket motors, provision is made for recovery of the auxiliary units. They may be used to augment thrust during initial launching. Upon separation of the final-stage module, the auxiliary units remain attached to the other module, and are carried by it to above a landing site, where they are released and landed by parachute, while the module then lands as a winged aircraft.

(4) As an alternative to (3), one of the auxiliary units may act as the final stage of the vehicle, both modules being landed shortly after separation.

In the ninth vehicle, shown in FIGURE 10, four modules A, A, B, C are arranged in an H layout. Modules A are first-stage. At launch, all motors are in use, but fuel is drawn from modules A only. When modules A separate from the cluster, modules B and C continue together, with all their motors in use, but drawing fuel from module B only. Finally, modules B and C separate, and module C, which still has a full load of fuel, carries on, under its own powder, into orbit. Modules arranged in this H layout may also be associated with nose components, as shown in FIGURES 6 to 8, and with auxiliary components as shown in FIGURE 9.

In the tenth vehicle, shown in FIGURE 11, two modules and one auxiliary component are assembled in a modified pyramid layout.

In the eleventh vehicle, shown in FIGURE 12, three modules are arranged in a pyramid with their "lower" surfaces (32 in FIGURE 1) outwards. This has the advantage of reducing the drag of the vehicle, since the "lower" surfaces are more smoothly curved than the "upper" surfaces of the modules, but does necessitate arranging for the control surfaces 28 (FIGURE 1) to fold completely against the upper surface, and to be of the type which in use operates at an angle of about 135° to the upper surface.

FIGURE 13 shows a twelfth vehicle which is similar in layout to the first vehicle, shown in FIGURE 2, but in which the modules differ somewhat from that shown in FIGURE 1. In particular, there is a cluster of four rocket motor units 38 in a housing 40, and no central fin. Furthermore, the modules have crew compartments of differing sizes, the modules A, A each accommodating a single pilot, while the module B accommodates several people.

FIGURE 14 shows another form of module, suited for the thirteenth vehicle, shown in FIGURE 15. The nose is elongated as compared with FIGURE 1, and it is not necessary for the control surfaces to swing. There are three swivelling rocket motors 42.

In the vehicle shown in FIGURE 15, four of the modules shown in FIGURE 14 are "stacked" against one another. As in FIGURE 10, they are operated as three stages A, A; B; C. This vehicle may be launched either vertically or at an inclination.

In the fourteenth vehicle, shown in FIGURE 16, three modules are "stacked" but not all the same way up. Moreover, as in FIGURE 13, the crew accommodation varies between the modules.

It is desirable in all these arrangements for the basic structure of all modules to be identical, but a module used as a final stage may be fitted with heat-resisting cladding on exposed parts. Preferably also the rocket motors are, as a manufacturing economy, made identical or nearly so.

We claim:

1. A space vehicle, which includes a final stage intended to travel beyond the earth's atmosphere, and a first stage intended to accompany the final stage during the first part of launching, and then become separated from it, the vehicle being an assembly of components grouped together, said first stage including at least two modules which are shaped so that individually they are capable of flight in the atmosphere with substantial aerodynamic lift, each module having a similar delta planform, with an elongated nose and a deep cross section to accommodate large quantities of fuel, and having identical basic structure, each module having a rear propulsion nozzle system so placed in the assembly that it can operate prior to separation of the components from one another.

2. A space vehicle according to claim 1, in which the final stage is constituted by a module.

3. A space vehicle according to claim 1, consisting entirely of modules.

4. A space vehicle according to claim 1, including means for transferring fuel between modules in such a way that, upon separation, the modules or module which are to continue as a further stage have a full load of fuel, while those modules which are to descend and be recovered have no more fuel than is required for manoeuvre and landing.

5. A space vehicle according to claim 1, including at least one component other than a module, this other component including a rocket motor and being recoverable by remaining secured to a recoverable module after separation from another stage of the vehicle.

6. A space vehicle according to claim 1, in which at least two modules are assembled together with their longitudinal axes substantially parallel to one another.

7. A space vehicle according to claim 6, in which all the longitudinal axes are in a common plane.

8. A space vehicle according to claim 7, in which all the modules are in the same attitude.

9. A space vehicle, which includes a final stage intended to travel beyond the earth's atmosphere, and a first stage intended to accompany the final stage during the first part of launching, and then become separated from it, the vehicle being an assembly of components grouped together, including at least three modules which are shaped so that individually they are capable of flight in the atmosphere with substantial aerodynamic lift, each module having a similar delta planform, with an elongated nose and a deep cross section to accommodate large quantities of fuel, the said modules being arranged in a pyramid, and each module having a rear propulsion nozzle system so placed in the assembly that it can operate prior to separation of the components from one another, said first stage including at least one of said modules.

10. A space vehicle according to claim 9, including at least one further component ahead of the pyramid.

11. A space vehicle according to claim 1, in which at least three modules are arranged in a pyramid.

References Cited

UNITED STATES PATENTS

| | | | |
|---|---|---|---|
| 2,792,784 | 5/1957 | Corrick et al. | 102—49 |
| 3,104,079 | 9/1963 | Phillips | 244—1 |
| 3,132,825 | 5/1964 | Postle et al. | 244—1 |
| 3,202,381 | 8/1965 | Woenscher | 244—2 X |
| 3,276,722 | 10/1966 | Eggers, et al. | 244—1 |

FOREIGN PATENTS

| | | |
|---|---|---|
| 696,751 | 9/1953 | Great Britain. |
| 130,841 | 2/1951 | Sweden. |

OTHER REFERENCES

Tinnan, Reusable Launch Systems, Astronautics, January, 1963, pages 50–56.

FERGUS S. MIDDLETON, *Primary Examiner.*

MILTON BUCHLER, *Examiner.*

B. BELKIN, *Assistant Examiner.*